United States Patent
Khotimsky et al.

(10) Patent No.: US 10,003,428 B2
(45) Date of Patent: Jun. 19, 2018

(54) USING NOISY WINDOW FOR UNCALIBRATED OPTICAL NETWORK UNIT ACTIVATION

(71) Applicants: ZTE Corporation, Shenzhen (CN); ZTE (USA) Inc., Austin, TX (US)

(72) Inventors: Denis Andreyevich Khotimsky, Westborough, MA (US); SongLin Zhu, Shanghai (CN); DeZhi Zhang, Shanghai (CN)

(73) Assignees: ZTE Corporation, Shenzhen, P.R. (CN); ZTE (USA) Inc., Richardson, TX (US)

( * ) Notice: Subject to any disclaimer, the term of this patent is extended or adjusted under 35 U.S.C. 154(b) by 45 days.

(21) Appl. No.: 14/891,643

(22) PCT Filed: Mar. 24, 2014

(86) PCT No.: PCT/CN2014/073972
§ 371 (c)(1),
(2) Date: Nov. 16, 2015

(87) PCT Pub. No.: WO2014/183504
PCT Pub. Date: Nov. 20, 2014

(65) Prior Publication Data
US 2016/0087748 A1    Mar. 24, 2016

(30) Foreign Application Priority Data

May 15, 2013  (WO) ................ PCT/CN2013/075661

(51) Int. Cl.
*H04B 10/27*    (2013.01)
*H04J 14/00*    (2006.01)
(Continued)

(52) U.S. Cl.
CPC ........ *H04J 14/0221* (2013.01); *H04B 10/272* (2013.01); *H04J 14/025* (2013.01)

(58) Field of Classification Search
CPC .... H04B 10/272; H04J 14/025; H04J 14/0221
(Continued)

(56) References Cited

U.S. PATENT DOCUMENTS

| 8,953,936 B2 * | 2/2015 | Hood | H04B 10/032 |
| | | | 398/66 |
| 2002/0071149 A1 * | 6/2002 | Xu | H04B 10/032 |
| | | | 398/5 |

(Continued)

FOREIGN PATENT DOCUMENTS

| CN | 101944949 A | 1/2011 |
| CN | 102223586 A | 10/2011 |

(Continued)

OTHER PUBLICATIONS

Qiu et al, Development of GPON Upstream Physical Media Dependent Prototypes, Nov. 2004, OSA, JOLWT, pages All Document.*
(Continued)

*Primary Examiner* — Ken N Vanderpuye
*Assistant Examiner* — Dibson Sanchez
(74) *Attorney, Agent, or Firm* — Perkins Coie LLP (57) ABSTRACT

A method of Noisy Window and associated management messages to support set splitting if activating ONUs with uncalibrated transmitter, offering a power grant for unmodulated upstream transmission, measuring the average received optical power in all upstream wavelength channels and providing downstream indication of the upstream wavelength channel with abnormally high average received power.

18 Claims, 9 Drawing Sheets

(51) Int. Cl.
*H04J 14/02* (2006.01)
*H04B 10/272* (2013.01)

(58) Field of Classification Search
USPC .......................................... 398/58–64, 66–73
See application file for complete search history.

(56) References Cited

U.S. PATENT DOCUMENTS

| | | | | |
|---|---|---|---|---|
| 2005/0249500 A1* | 11/2005 | Liaw | ................... | H04Q 11/0067 398/70 |
| 2006/0093356 A1* | 5/2006 | Vereen | ................... | H04L 43/00 398/33 |
| 2007/0058973 A1* | 3/2007 | Tanaka | ................ | H04B 10/032 398/1 |
| 2007/0127923 A1* | 6/2007 | Dalton | ................. | H04B 10/272 398/71 |
| 2007/0189767 A1* | 8/2007 | Pfeiffer | ............... | H01S 3/06754 398/30 |
| 2007/0201867 A1* | 8/2007 | DeLew | ............... | H04B 10/077 398/38 |
| 2007/0237520 A1* | 10/2007 | DeLew | ............. | H04B 10/0799 398/17 |
| 2007/0237523 A1 | 10/2007 | Miguel et al. | | |
| 2008/0002718 A1* | 1/2008 | Bernard | ............. | H04Q 11/0067 370/395.51 |
| 2008/0056714 A1* | 3/2008 | Konstan | ............. | H04B 10/0773 398/38 |
| 2008/0175588 A1* | 7/2008 | Bernard | ................ | H04L 41/069 398/17 |
| 2008/0291196 A1* | 11/2008 | Ceruti | .................... | H04L 41/12 345/418 |
| 2008/0292312 A1* | 11/2008 | Oron | ................. | H04B 10/0795 398/33 |
| 2008/0304828 A1* | 12/2008 | Mizutani | ................ | H04B 1/707 398/78 |
| 2009/0024725 A1* | 1/2009 | Bernard | ................... | H04L 41/00 709/223 |
| 2009/0060496 A1* | 3/2009 | Liu | ....................... | H04J 3/0682 398/17 |
| 2009/0067838 A1* | 3/2009 | Chen | ......................... | H04N 7/22 398/58 |
| 2009/0129773 A1* | 5/2009 | Oron | ................. | H04B 10/0793 398/10 |
| 2009/0263132 A1* | 10/2009 | Rafel | .................... | H04J 3/0682 398/66 |
| 2010/0098413 A1 | 4/2010 | Li et al. | | |
| 2010/0226649 A1* | 9/2010 | Cheng | ................ | H04J 14/0209 398/72 |
| 2011/0020002 A1* | 1/2011 | Yoon | .................... | H04B 10/272 398/63 |
| 2011/0229140 A1* | 9/2011 | Ohlen | ................. | H04B 10/272 398/79 |
| 2011/0255866 A1 | 10/2011 | Van Veen et al. | | |
| 2012/0045201 A1* | 2/2012 | Skubic | ................. | H04B 10/272 398/38 |
| 2013/0004161 A1* | 1/2013 | Xia | ..................... | H04Q 11/0067 398/25 |
| 2013/0148956 A1* | 6/2013 | Khotimsky | .......... | H04B 10/032 398/2 |
| 2013/0148962 A1* | 6/2013 | Heimbuch | ......... | H04B 10/0799 398/38 |
| 2014/0161461 A1* | 6/2014 | Lee | ....................... | H04J 3/0682 398/79 |
| 2014/0294385 A1 | 10/2014 | Khotimsky et al. | | |
| 2014/0369676 A1* | 12/2014 | Hamaoka | ........... | H04L 12/2861 398/25 |
| 2015/0125153 A1* | 5/2015 | Lee | .................... | H04B 10/0793 398/79 |
| 2015/0207585 A1* | 7/2015 | Luo | ..................... | H04J 14/0256 398/72 |
| 2015/0318928 A1* | 11/2015 | Yoo | .................... | H04J 14/0282 398/25 |
| 2015/0318930 A1* | 11/2015 | Grobe | .................... | H04B 17/11 398/79 |
| 2015/0365192 A1* | 12/2015 | Kim | .................... | H04J 14/0256 398/66 |
| 2016/0105253 A1* | 4/2016 | Liu | ..................... | H04Q 11/0067 398/67 |

FOREIGN PATENT DOCUMENTS

| | | |
|---|---|---|
| EP | 2 413 518 A1 | 2/2012 |
| EP | 2 541 822 A2 | 1/2013 |
| WO | 2010/111954 A1 | 10/2010 |

OTHER PUBLICATIONS

Extended Search Report dated Nov. 16, 2016 for European Patent Application No. 14798367.0, filed on Mar. 24, 2014 (6 pages).
International Search Report and Written Opinion dated Jul. 14, 2014 for International Application No. PCT/CN2014/073972, filed on Mar. 24, 2014 (11 pages).

* cited by examiner

USING NOISY WINDOW FOR UNCALIBRATED OPTICAL NETWORK UNIT ACTIVATION

BACKGROUND

This document relates to systems, devices, and techniques that implement data communications in a multi-wavelength passive optical network and, more specifically, with the methods of effective and efficient activation of ONUs (optical network units) with weak transmitter pre-calibration properties.

SUMMARY

The present documents provides techniques, among others, for activating uncalibrated ONUs in an optical network, while minimize adverse impact on the communication bandwidth for other ONUs already operating in the network. A Noisy Window time interval is provided for ONU activation in a multi-wavelength passive optical network (PON) system.

In one aspect, a method, apparatus and computer program product are disclosed for selecting a set from the plurality of ONUs attempting activation in the optical communication network, instructing the plurality of OLTs to issue a coordinated power grant by which the set of plurality of ONUs is instructed to perform an upstream transmission in a specified time interval, the coordinated power grant not suppressing uplink transmissions by other ONUs not in the set of ONUs, receiving from the OLTs reports informing of uplink power levels observed during the specified time interval that above a pre-determined threshold, and instructing, based on the received reports, the OLTs to transmit a downstream power indication signal to facilitate activation of at least one ONU from the set of OLTs.

In another aspect, an optical communication system is disclosed that includes (a) an optical distribution network (ODN) comprising trunk fiber, one or more branching element, and a plurality of distribution fibers of the ODN, (b) a plurality of optical line terminations (OLTs) attached via a wavelength multiplexor (WM) to the trunk fiber of the ODN, each said OLT being associated with an individual bi-directional wavelength channel comprising a single downstream and single upstream wavelengths, and supporting a specific downstream line rate and one or more distinct upstream line rates, (c) a Wavelength Coordinator communicating with said plurality of optical line terminations (OLTs), and (d) a plurality of optical network units (ONUs), each said ONU being attached to a respective distribution fiber, being tunable over a specific range of downstream wavelengths and a specific range of upstream wavelengths, and supporting a specific downstream line rate and a specific upstream line rate. The Wavelength Coordinator executes a Noisy Window procedure to facilitate ONU transmitter calibration and ONU activation on said MW-PON system.

DETAILED DESCRIPTION

The disclosed method of Noisy Window for ONU activation in a multi-wavelength PON system introduces two extra steps into the activation procedure to accommodate the uncalibrated ONUS, compared to a conventional TDM PON system.

First, the OLT performs set splitting to reduce the probability that two or more ONUS may utilize the method simultaneously. The set splitting is achieved by using a Serial_Number_Mask message that restricts the ONUS that may use an invocation of the method. If the Serial Numbers of the subtending ONU population is known in advance, the OLT may use the Serial_Number_Mask message to isolate an individual ONU. If the Serial numbers are not known, the OLT may use the Serial_Number_Mask message to identify a random subset of the subtending ONU population.

Once the set of ONU which are allowed to participate is established, the OLT invokes the method of Noisy Window by offering a power grant as an opportunity to transmit an unmodulated or low-frequency modulated signal that carries no discernible information and does not prevent the regular upstream transmission bursts from being received. The OLT measures the average received power level on all active upstream wavelength channels and provides the downstream indication of the upstream wavelength channel with abnormally high received optical power. An activating ONU employs this indication to calibrate its initialization channel and then uses the channel map to retune to the proper upstream activation channel.

A passive optical network (PON) is an optical network architecture based on point-to-multipoint (P2MP) topology in which a single optical fiber and multiple passive branching points are used to provide data communication services. A PON system can facilitate user access with a service provider communication facility to access telecommunication, information, entertainment, and other resources of the Internet. A PON system can include a central node, called an optical line terminal (OLT), which can be in connection with a single or multiple user nodes called optical network units (ONUS) via a passive optical distribution network (ODN). An ONU can be located at or near the access user's premises. An OLT can be located at the access provider's communication facility (central office). In a conventional PON based on time-division multiplexing/time-division multiple access (TDM/TDMA) principles, such as G.984 G-PON or G.987 XG-PON, the OLT operates on a single downstream wavelength and a single upstream wavelength.

The plurality of the ONUS connected to the OLT over the ODN share the same downstream and same upstream wavelength.

When an ONU joins or resumes operations on a conventional TDM PON system, it has to undergo activation, that is, a set of distributed procedures executed by the OLT and the ONU and comprising the phases of parameter learning, serial number acquisition (discovery), and ranging. The activation procedure requires the OLT to regularly broadcast relevant operational parameters and, from time to time, to open a quiet window in which the activating ONUs are able to announce themselves so that the OLT is able to discover and range such ONUs. The quiet window is a time interval so called because the OLT must temporarily to the transmissions of the active traffic flows on the PON system to avoid collisions of the upstream transmission bursts of the newly activated ONUs with the regular upstream transmission bursts of the in-service ONUs. Within a quiet window, the OLT transmits a Serial Number grant, which invites an activating ONU to announce its unique Serial Number in the upstream transmission burst. That serial Number serves as the identifying information allowing the OLT to assign the local ID to the ONU and to address it directly in the subsequent communications. To support a possibility of multiple ONUs transmitting within a single quiet window, the quiet window is made large enough, and the transmission times are subject to additional randomization. An activating ONU's transmission during the quiet window carries the identifying information that allows the OLT to assign the local ID to the ONU and address it directly in the subsequent communication. Because of the temporary suppression of the active flows, the quiet windows are associated with adverse service impact, but are necessary to support the operation of a TDM-PON-based optical access network.

In a multi-wavelength passive optical network (MW-PON), multiple OLTs each operating on a unique downstream wavelength channel and unique upstream wavelength channel are connected to one and the same ODN via a wavelength multiplexor (WM), and over the said ODN are connected to a plurality of ONUS. An upstream wavelength channel may be composed of multiple periodic wavelengths. A combination of one downstream wavelength channel and one upstream wavelength channel associated with a given OLT forms a bi-directional wavelength channel. Multiple downstream wavelengths reach each ONU; however, each ONU is capable of receiving and processing only one downstream wavelength at any given time and to generate only one upstream wavelength at any given time. An ONU may be designed to operate on a specific pair of downstream and upstream wavelengths, in which case it is a fixed ONU, or it may be capable of changing its downstream and upstream wavelength in time, in which case it is tunable ONU. A tunable ONU may its receiver and its transmitter tuned independently. An ONU with a tunable receiver sets the internal controlled receiver parameter, such as current, voltage, power, or temperature to a particular value to tune the receiver to particular wavelength. An ONU with a tunable transmitter sets the internal controlled transmitter parameter, such as current, voltage, power, or temperature to a particular value to tune the transmitter to particular wavelength. Since set of allowed bi-directional wavelength channels is finite, and the nominal operational wavelengths corresponding to each bi-directional wavelength channel can be specified in advance in a standard or operational document, the actual downstream or upstream wavelength value can be without loss of generality substituted, respectively, by a downstream or upstream channel index (channel ID).

Calibration is a process of establishing a correspondence between the value of the internal controlled parameter and the attainable wavelength in the downstream and upstream directions, respectively. Calibration can be achieved at a factory or in a laboratory prior to installation into the network, in which case it is referred to as pre-calibration, or in the course of operation, in which case it is known as in-service calibration. Since pre-calibration impacts the cost of a device, with higher accuracy of pre-calibration being associated with the higher cost, it is reasonable for a network operator to procure an ONU with the weakest calibration properties that satisfy the operational requirements and constraints of the network.

If an ONU with a transceiver having strong calibration properties is installed in a TWDM-PON-based access network, its initial upstream wavelength (and the wavelength channel) can be controlled, so that the quiet window opened by the OLT to avoid collision between the upstream transmission bursts of the newly activated ONUS with the regular upstream transmission bursts of the in-service ONUS can be confined to a single wavelength channel.

If an ONU with an uncalibrated transceiver is installed in a TWDM-PON-based access network, on its initial activation it is impossible to predict on which upstream wavelength and on which upstream wavelength channel it will transmit. If so is the case, the quiet window that is opened by the OLT to avoid collision between the upstream transmission bursts of the newly activated uncalibrated ONUS with the regular upstream transmission bursts of the in-service ONUS must span all active upstream wavelength channels, thus causing maximal service impact. The upstream wavelength channel on which an ONU with an uncalibrated transceiver start transmitting upon activation is referred to as an initialization channel. The upstream wavelength channel on which the OLT expects the ONU's Serial Number transmission and, therefore, opens a quiet window to avoid collisions with the regular upstream transmission bursts of the in-service ONUS is referred to as the activation channel.

The present document teaches, among other techniques, a method how to modify the ONU activation procedure in the TWDM-PON to minimize service impact of a quiet window, limiting it to a single wavelength channel even when the uncalibrated ONUS have to be activated on the network.

Figure 1:
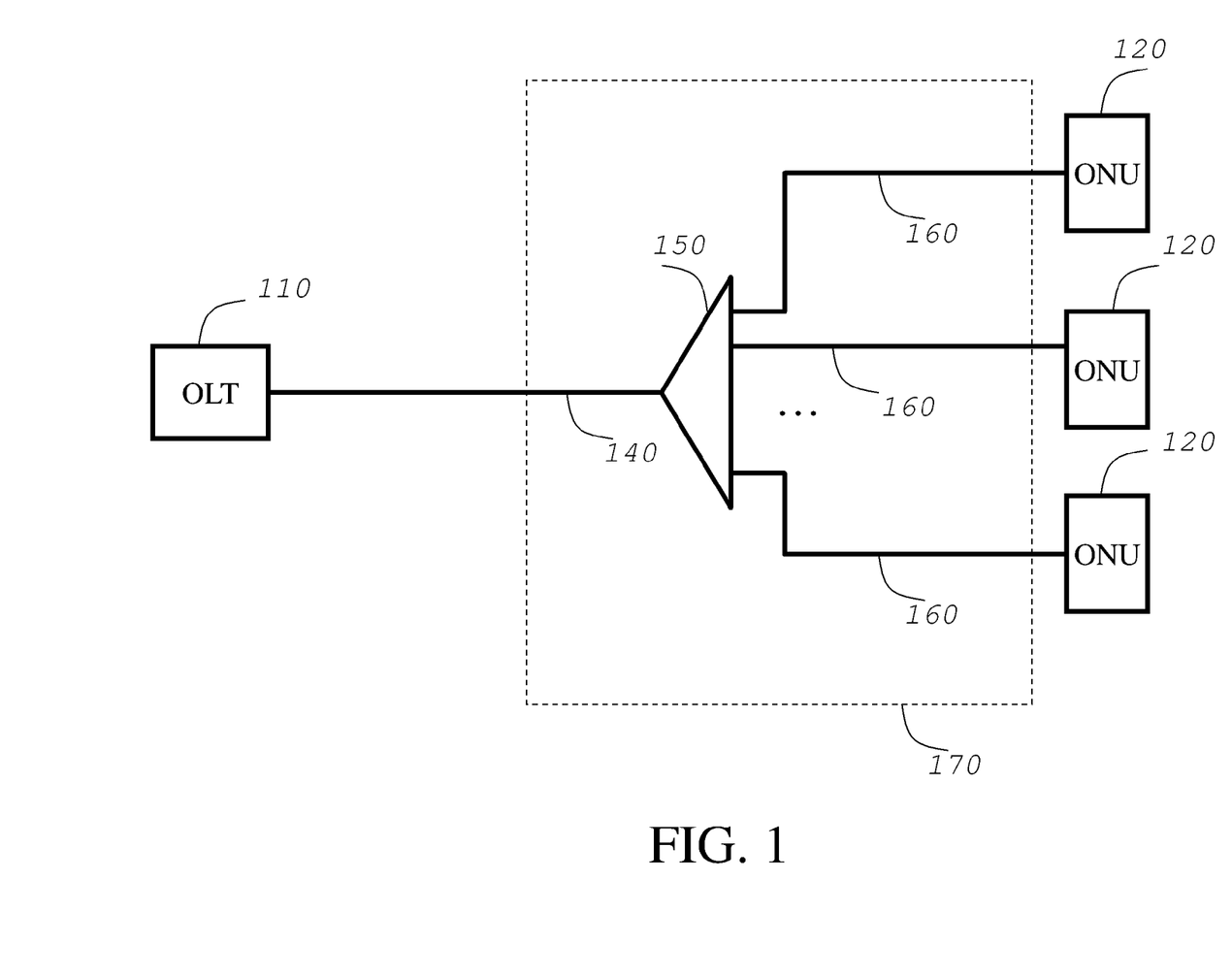
FIG. 1 shows a typical single-channel TDM PON system.

A conventional TDM/TDMA PON system (see FIG. 1) is composed of a single OLT 110 and a plurality of ONUs 120 interconnected by an optical distribution network (ODN) 170 that includes optical feeder fiber or trunk fiber 140, splitter 150, and multiple distribution fibers 160. Such PON systems support a single bi-directional wavelength channel offering unique downstream and unique upstream line rates. All ONUs 120 support fixed downstream and upstream wavelengths and a fixed combination of downstream and upstream line rates. Once an ONU starts activation on the PON, there is a unique OLT it has to interact with, and there is decision to make whether the wavelength channel it supports is appropriate for activation. Prior to transmitting upstream in such a system, an ONU has to learn the parameters of the upstream burst, such as the preamble and delimiter sizes and patterns, that the OLT regularly sends in a downstream broadcast management message.

In a MW-PON system (see FIG. 2), several OLTs 210, each associated with its own wavelength channel, are attached to the ODN via the wavelength multiplex (WM)

Figure 2:
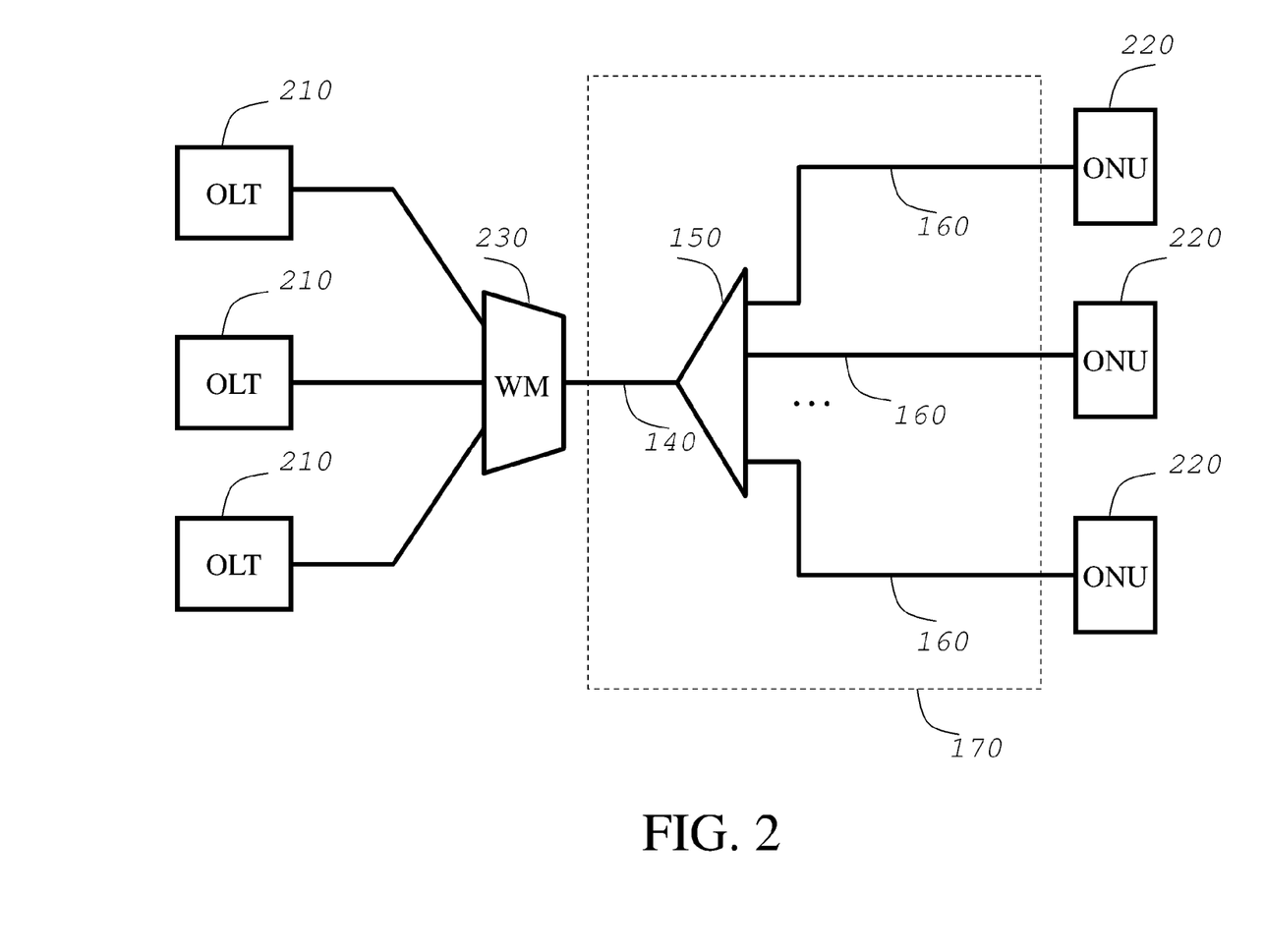
FIG. 2 shows a typical multi-wavelength PON system where multiple OLTs are connected to the conventional ODN via a wavelength multiplexor.

230. Among the OLTs that support the common protocol (such as TDM/TWDM), different OLTs may support different downstream and upstream line rates. The MW-PON ONUs 220 could fixed or tunable are connected to the WM 230 and MW-PON OLTs 210 over ODN 170, which remains essentially the same as in the case of conventional TDM PON system.

Figure 3:
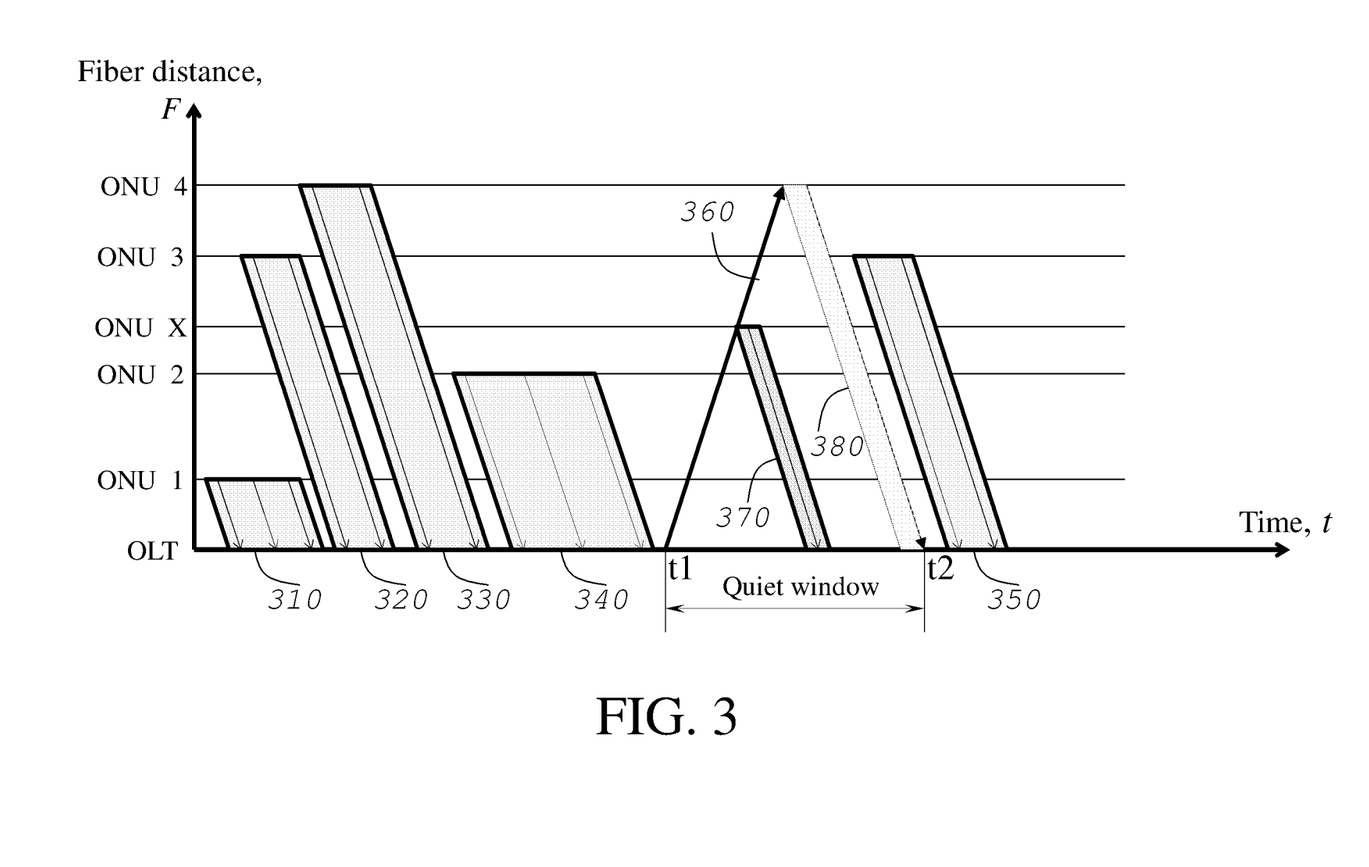
FIG. 3 presents a timing diagram of downstream communication in a TDM PON system for several ONU, each being characterized by a specific fiber distance from the OLT.

In an operational TDM PON system (see FIG. 3), the OLT directs the upstream transmissions by the active ONUs in such a way that the upstream transmission bursts of different ONUs (in this example, upstream burst 310 of ONU 1, upstream bursts 320 and 350 of ONU 3, upstream burst 330 of ONU 4, upstream burst 340 of ONU 2) arrive at the OLT serially and are received without interfering with each other. To ensure that the OLT can control the ONU in that way, each ONU has to be activated, that is, assigned a link-specific address and ranged. For each ranged ONU, the OLT knows its round-trip time and has assigned an equalization delay to compensate for the difference in said round-trip times. When a new ONU is activated on the TDM PON (ONU X in the example of FIG. 3), its round-trip time is not initially known. The OLT invites all such ONU to declare their presence on the TDM PON system by issuing a discovery grant 360 (which is known in ITU-T G.984 and G.987 systems as a Serial Number grant). ONU X responds to a discovery grant 360 with a message 370 (a Serial Number message in the terminology of ITU-T G.984 and G.987). It will be understood by one of skill in the art that the "slopes" to curves in FIG. 3 represent signal propagation delay through the optical medium of the optical network.

To avoid interference between the potential responses to the discovery grant and the regular downstream transmission bursts by active ONUS, the OLT suppresses the upstream transmission by active ONUS during the time interval between the potentially earliest response by an ONU with the shortest fiber distance (if the fiber distance has no lower limit, this is the moment t1 when the discovery grant is transmitted) and the potentially latest response 380 from the farthest ONU in the system. The time interval when the OLT suppresses the regular downstream transmission by active ONUS to allow the new ONUS to transmit their discovery grant responses is known as the quiet window.

Figure 4:
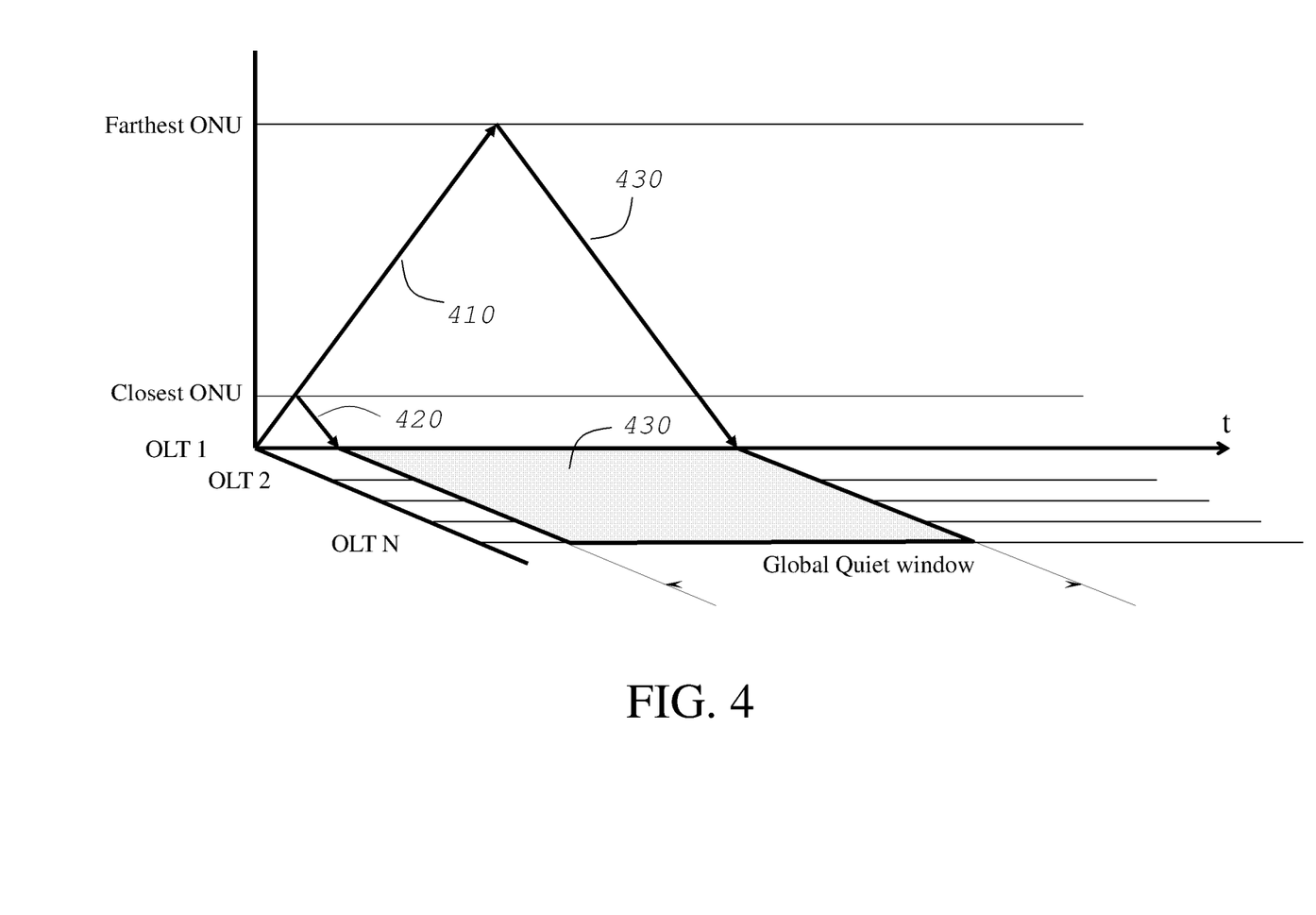
FIG. 4 presents a simplified timing diagram of downstream communication in a MW-PON system.

In a multi-wavelength TWDM PON system where the ONUS exhibit weak pre-calibration properties (see FIG. 4), a new ONU may initially be tuned to a downstream wavelength channel associated with one OLT and to a upstream wavelength channel associated with a different OLT. When a discovery grant 410 is transmitted on a downstream wavelength channel associated with ONU 1, the response may arrive on a upstream wavelength channel associated with any OLT in the system. To prevent the interference, the suppression of regular upstream transmission is required on all upstream wavelength channels during the time interval between the earliest possible response 420 from the ONU with shortest fiber distance and the latest possible response 430 from the ONU with largest fiber distance. Thus a global quiet window 430 is formed. However, opening of frequent quiet windows that span all the channels in a multi-wavelength WDM system is constitutes a waste of bandwidth which is detrimental to the quality of service in the system.

Figure 5:
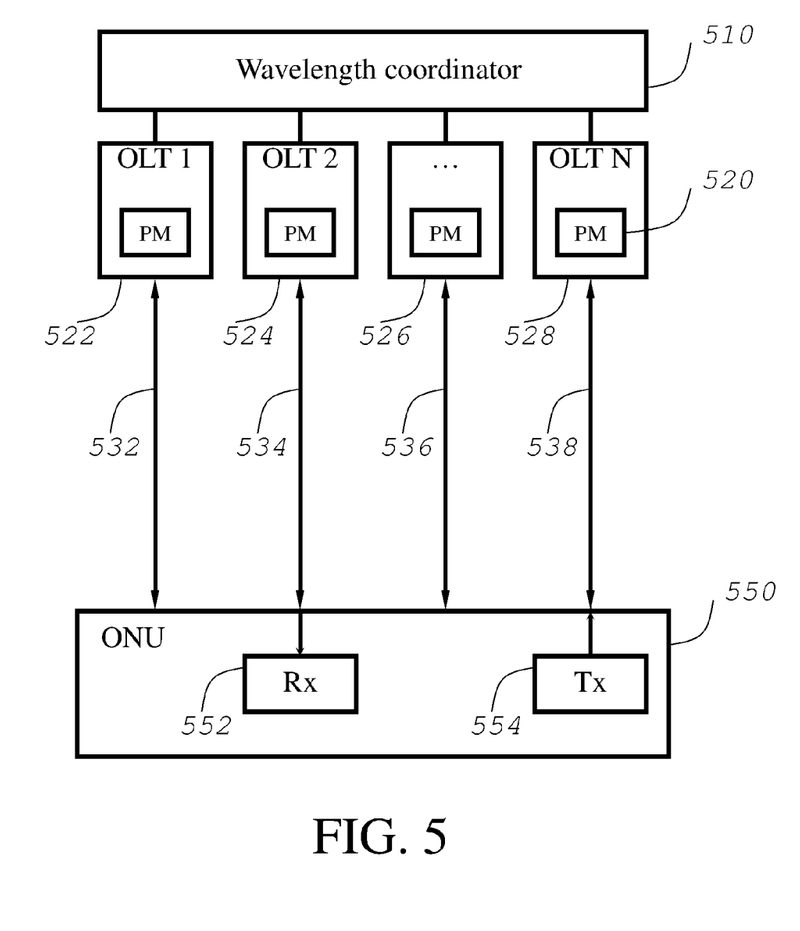
FIG. 5 depicts a system architecture where specifically each OLT is equipped with a received optical power meter, and all the OLTs are logically connected to a Wavelength Coordinator function.

FIG. 5 discloses the TWDM PON system architecture that allows to perform ONU activation without wasting bandwidth on global quiet windows. The system consists of a plurality of OLTs 522, 524, 526, 528, each associated with its bidirectional wavelength channel, respectively, 532, 534, 536, and 538. Each OLT is logically connected to the common Wavelength Coordinator 510, which is responsible, among other functions, for assisting in ONU activation and operational assignment to a specific bi-directional wavelength channel. Wavelength Coordinator 510 is a logical function that can be performed by a network element separate from the OLTs, by one selected OLT, or be distributed between multiple OLTs. An ONU 550 is capable of communicating on any bi-directional wavelength channel, but at any moment in time may have its receiver 552 attached to at most one downstream wavelength channel and its transmitter 554 attached to at most one upstream wavelength channel.

For an active ONU, the receiver 552 and transmitter 554 must be tuned to one and the same bi-directional wavelength channel. For a new weakly-calibrated ONU which is undergoing activation, the receiver 552 and transmitter 554 may be tuned to different bi-directional wavelength channels, unbeknown to the ONU and the OLT. As a part of the activation procedure, the receiver 552 and transmitter 554 should be retuned to the same bi-directional wavelength channels. The present disclosure specifically requires that each OLT be equipped with a power meter 520, capable of measuring the average received optical power in the upstream direction.

Figure 6:
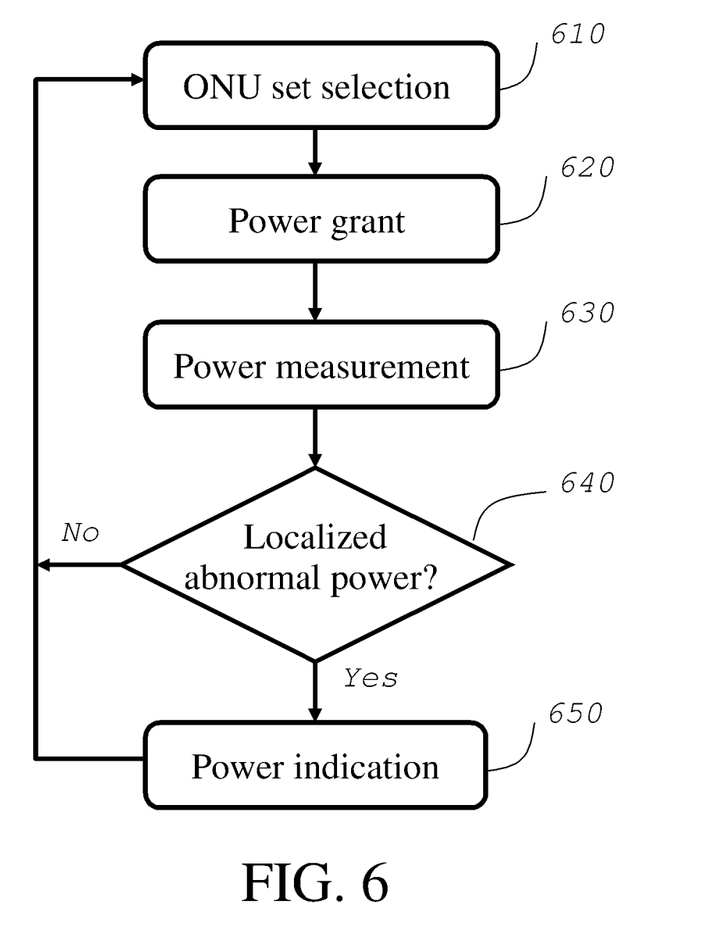
FIG. 6 depicts the Noisy Window procedure repeatedly executed by the Wavelength Coordinator to facilitate ONU transmitter calibration and ONU activation on the MW-PON system.

To support ONU self-calibration in the process of activation, the Wavelength Coordinator 510 executes the procedure disclosed in FIG. 6. Operating in a infinite loop, the Wavelength Coordinator 510 performs ONU set selection operation 610 to restrict the set of ONU that may take advantage of the procedure in each cycle. The ONU set selection employs a Serial Number Mask mechanism known in the state of the art, although in the different contexts. A version of the Serial Number Mask mechanism appeared in now defunct 2004 issue of ITU-T Recommendation G.984.3. More generally, the Serial Number Mask defines the serial number template along with the bit pattern, so that an ONU can compare its own serial number with the template masked by the pattern. The ONU can participate in the given cycle, if the match is found. In one embodiment, the Wavelength Coordinator 510 may sequentially select subsets of the ONU serial numbers in any systematic fashion, such as, all serial numbers ending at 00, 01, 10, 11. In another embodiment, the Wavelength Coordinator 510 may be aware of the identities of the ONUS that are undergoing activation, and invite a single ONU or a small group of ONUS to participate in the given cycle of the procedure. Once the Wavelength Coordinator 510 makes the ONU set selection decision, it instructs the OLTs to transmit the appropriate Serial Number Mask message in their respective bi-directional wavelength channels.

In the next procedural step 620, the Wavelength Coordinator 510 makes decision to initiate the power measuring period and instructs the OLTs to issue a coordinated Power Grant in their respective bi-directional wavelength channels. A Power Grant is an invitation to the selected ONU to initiate unmodulated or low-rate modulated upstream transmission within a specified time interval. A Power Grant does not involve suppression of the regular upstream transmission bursts by the active ONUS and, therefore, amounts to opening a noisy window, that is a time interval within which interference between a regular modulated upstream transmission and an unmodulated power transmission is allowed. However, despite the nominal interference the modulated signal can still be received and demodulated since the interfering transmission I unmodulated.

In the procedural step 630, the Wavelength Coordinator 510 instructs the OLTs to engage their respective Power Meters 520 to monitor the average received optical power and report any abnormally high power levels that may be caused by an unmodulated transmission by an activating ONU.

After the Wavelength Coordinator 510 collects the Power Meter reports from respective OLTs, it analyses the reports and, in the decision step 640, determines whether a localized abnormal optical power level has been observed. One implementation of the decision step 640, calls for a positive determination if and only if exactly one OLT has reported an abnormal received optical power level.

In the procedural step 650, contingent on the positive outcome of the decision step 640, the Wavelength Coordinator 510 instructs the OLTs to transmit the downstream channel abnormal Power Indication in their respective bi-directional wavelength channels. The Power Indication identifies the upstream channel in which abnormally high optical power has been observed, An ONU 550 that has participated in the given procedural cycle may use the Power Indication transmitted downstream to calibrate its upstream transmitter 554 and to align its receiver 552 and transmitter 554 at the same bi-directional wavelength channel.

Figure 7:
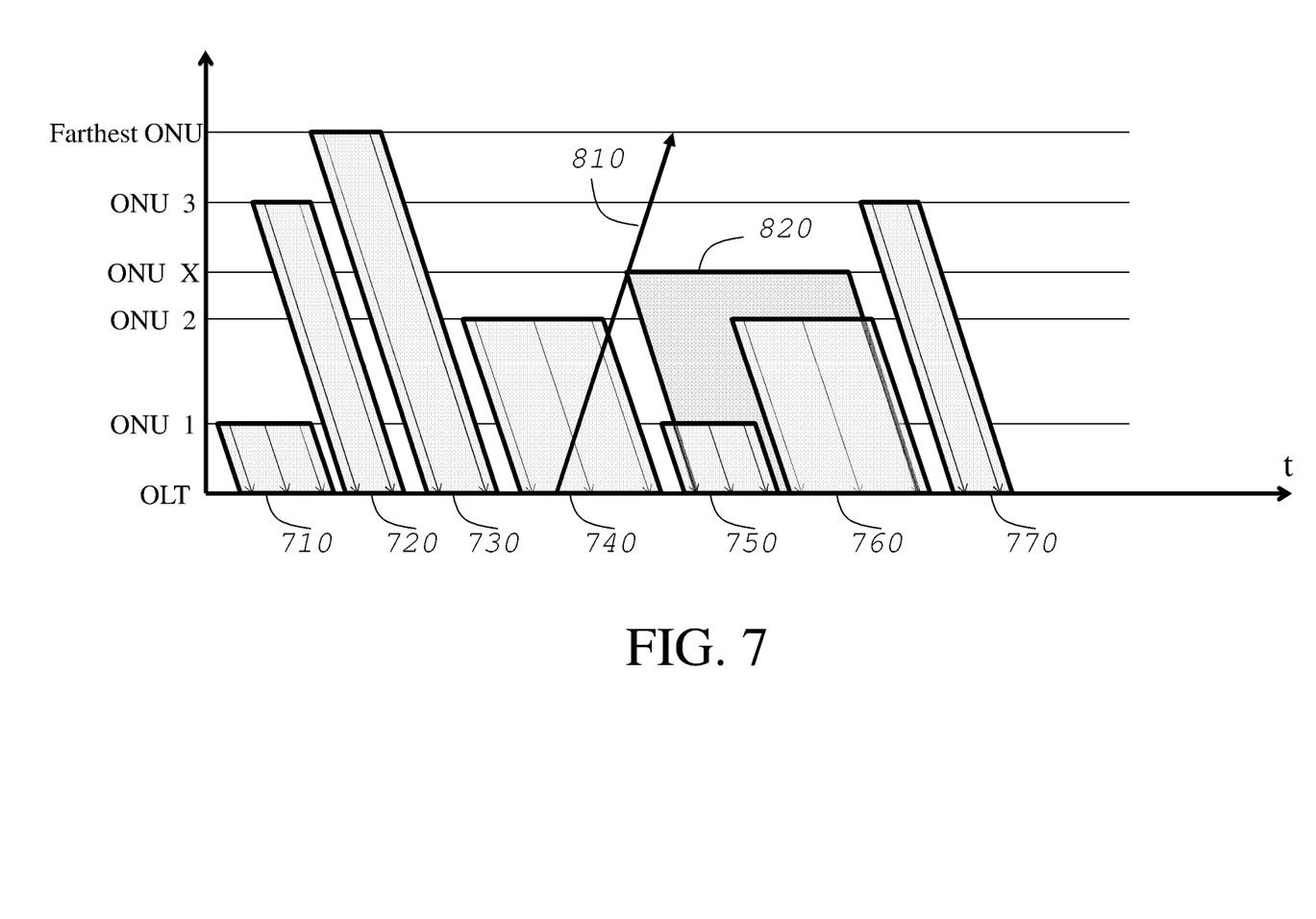
FIG. 7 presents a timing diagram of downstream communication in a MW PON system using the concept of Noisy Window for ONU transmitter calibration and ONU activation.

The timing diagram of FIG. 7 provides an illustration of the method by showing a series of non-interfering upstream bursts 710, 720, 730, 740, 750, 760 and 770, a Power Grant 810 which is received by participating ONU X, and an unmodulated transmission 820 that is transmitted by the ONU X along with regular upstream bursts 750 and 760 with a noisy window time interval.

Figure 8:
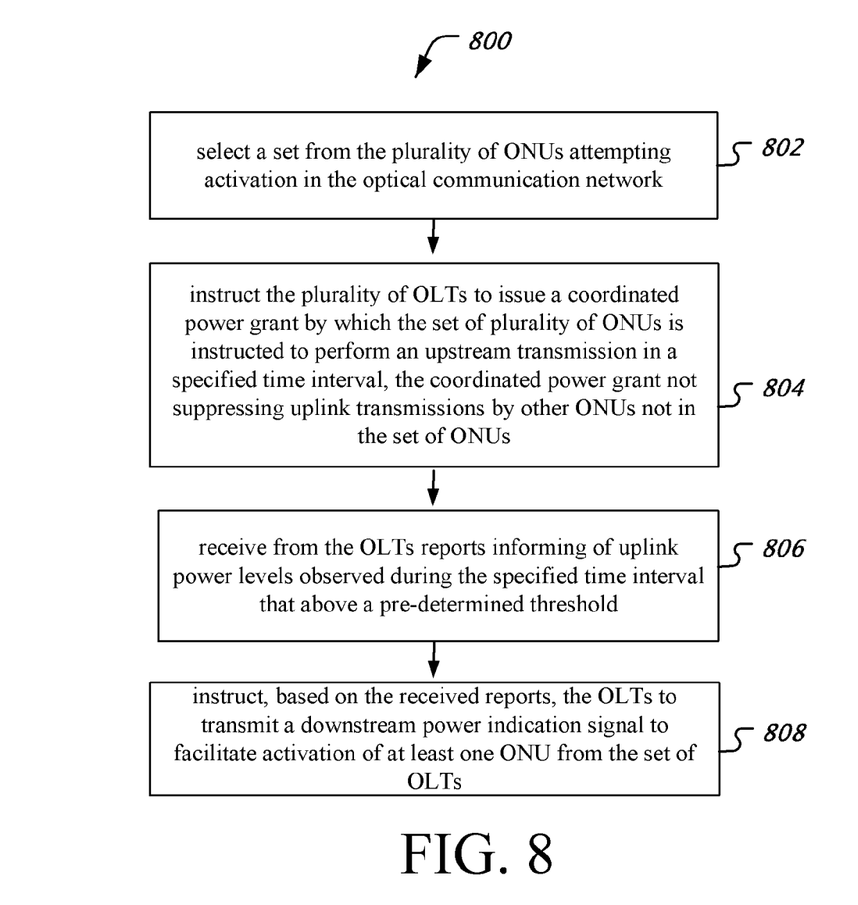
FIG. 8 is a flowchart representation of a process of optical communications.

FIG. 8 is a flowchart representation of a process 800 of optical communication. The process 800 may be implemented in an optical communication network comprising a plurality of optical line terminations (OLTs) communicatively coupled to a plurality of optical network units (ONUS) using wavelength multiplexed optical communication. As previously described, the process 800 may be implemented in a Wavelength Coordinator 510.

At 802, the process 800 selects a set from the plurality of ONUs attempting activation in the optical communication network. The selected set may be based on the previously disclosed set splitting technique in which ONUs sharing common bits in their IDs may be grouped together into the set. The "splitting" here refers to a logical splitting of ONUs into multiple logical groups.

At 804, the process 800 instructs the plurality of OLTs to issue a coordinated power grant by which the set of plurality of ONUs is instructed to perform an upstream transmission in a specified time interval, the coordinated power grant not suppressing uplink transmissions by other ONUs not in the set of ONUs.

At 806, the process 800 receives from the OLTs reports informing of uplink power levels observed during the specified time interval that above a pre-determined threshold. The OLTs may generate the reports based on monitoring of uplink transmissions. The pre-determined threshold may be selected to detect the previously disclosed abnormally high power levels. The threshold may, e.g., correspond to a 6 to 30 dB increase in the monitored optical signal strength in the uplink direction.

At 808, the process 800 instructs, based on the received reports, the OLTs to transmit a downstream power indication signal to facilitate activation of at least one ONU from the set of OLTs. In some embodiments, the received reports indicate to the process 800 the upstream channels on which uncalibrated ONUs attempting activation in the network are operating. Upon such detection, the ONU may be instructed in a downstream message to calibrate its upstream transmitter 554 and to align its receiver 552 and transmitter 554 at the same bi-directional wavelength channel.

Figure 9:
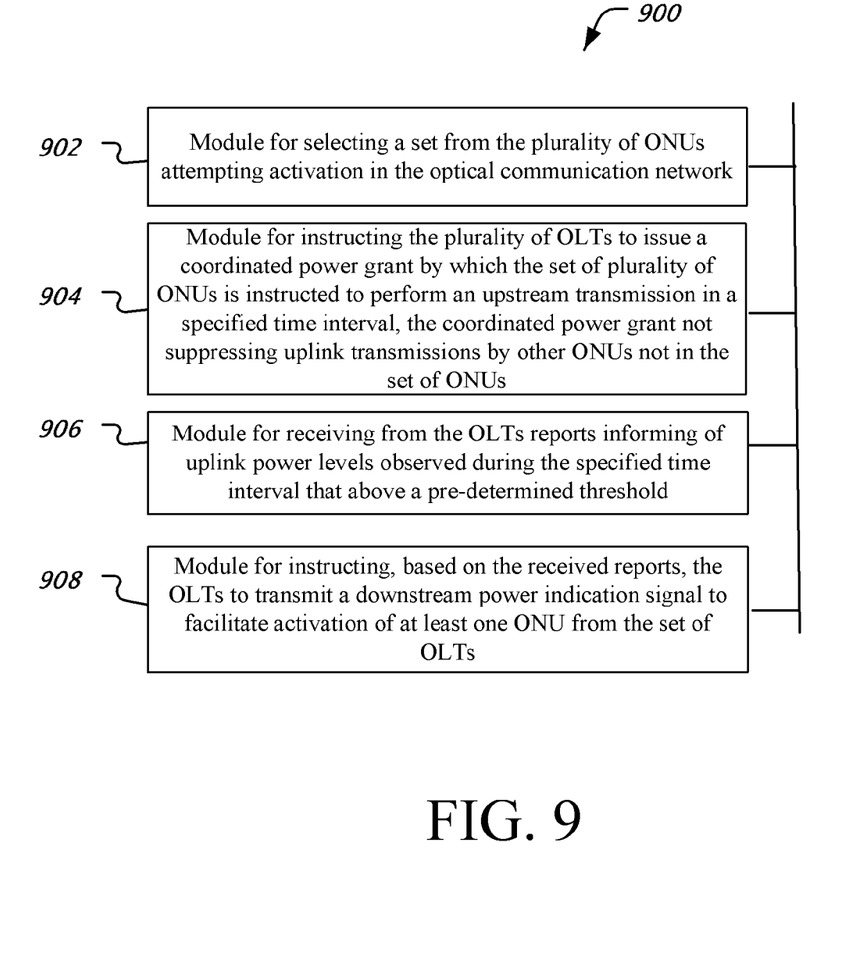
FIG. 9 is a block diagram representation of an optical communication apparatus.

FIG. 9 is a block diagram representation of an apparatus 900 for optical communications. The module 902 is for selecting a set from the plurality of ONUs attempting activation in the optical communication network. The module 904 is for instructing the plurality of OLTs to issue a coordinated power grant by which the set of plurality of ONUs is instructed to perform an upstream transmission in a specified time interval, the coordinated power grant not suppressing uplink transmissions by other ONUs not in the set of ONUs. The module 906 is for receiving from the OLTs reports informing of uplink power levels observed during the specified time interval that above a pre-determined threshold. The module 908 is for instructing, based on the received reports, the OLTs to transmit a downstream power indication signal to facilitate activation of at least one ONU from the set of OLTs. The apparatus 900 and modules 902, 904, 906, 908 may further be configured to implement a technique disclosed herein.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of optical communication implemented in an optical communication network comprising a plurality of optical line terminations (OLTs) communicatively coupled to a plurality of optical network units (ONUs) using wavelength multiplexed optical communication, comprising:
    selecting a set from the plurality of ONUs attempting activation in the optical communication network;
    instructing the plurality of OLTs to issue a coordinated power grant by which the set of plurality of ONUs is instructed to perform an upstream transmission in a specified time interval, the coordinated power grant not suppressing uplink transmissions by other ONUs not in the set of ONUs;
    receiving from the plurality of OLTs reports informing of uplink power levels observed during the specified time interval that are above a pre-determined threshold; and
    instructing, based on the received reports, the plurality of OLTs to transmit a downstream power indication signal to facilitate activation of at least one ONU from the set of ONUs.

2. The method of claim 1, wherein the set of the plurality of ONUs is selected based on a serial number mask mechanism.

3. The method of claim 1, wherein the upstream transmission comprises an unmodulated signal transmission.

4. The method of claim 1, wherein the pre-determined threshold is selected to detect presence of a single ONU.

5. The method of claim 1, wherein the coordinated power grant not suppressing uplink transmissions by other ONUs not in the set of ONUs is during the specified time interval.

6. The method of claim 1, wherein each of the plurality of OLTs are configured to operate on a unique downstream wavelength channel and a unique upstream wavelength channel.

7. An apparatus for optical communication operable in an optical communication network comprising a plurality of optical line terminations (OLTs) communicatively coupled to a plurality of optical network units (ONUs) using wavelength multiplexed optical communication, the apparatus comprising:
    a selection module that selects a set from the plurality of ONUs attempting activation in the optical communication network;
    a power grant module that instructs the plurality of OLTs to issue a coordinated power grant by which the set of plurality of ONUs is instructed to perform an upstream transmission in a specified time interval, the coordinated power grant not suppressing uplink transmissions by other ONUs not in the set of ONUs;
    a report reception module that receives from the plurality of OLTs reports informing of uplink power levels observed during the specified time interval that are above a pre-determined threshold; and
    a power indication module that instructs, based on the received reports, the plurality of OLTs to transmit a downstream power indication signal to facilitate activation of at least one ONU from the set of ONUs.

8. The apparatus of claim 7, wherein the set of the plurality of ONUs is selected based on a serial number mask mechanism.

9. The apparatus of claim 7, wherein the upstream transmission comprises an unmodulated signal transmission.

10. The apparatus of claim 7, wherein the pre-determined threshold is selected to detect presence of a single ONU.

11. The apparatus of claim 7, wherein the coordinated power grant not suppressing uplink transmissions by other ONUs not in the set of ONUs is during the specified time interval.

12. The apparatus of claim 7, wherein each of the plurality of OLTs are configured to operate on a unique downstream wavelength channel and a unique upstream wavelength channel.

13. A computer program product comprising a non-transitory computer-readable program medium having code stored thereon, the code, when executed, causing a processor to implement a method of optical communication implemented in an optical communication network comprising a plurality of optical line terminations (OLTs) communicatively coupled to a plurality of optical network units (ONUs) using wavelength multiplexed optical communication, the method comprising:

selecting a set from the plurality of ONUs attempting activation in the optical communication network;

instructing the plurality of OLTs to issue a coordinated power grant by which the set of plurality of ONUs is instructed to perform an upstream transmission in a specified time interval, the coordinated power grant not suppressing uplink transmissions by other ONUs not in the set of ONUs;

receiving from the plurality of OLTs reports informing of uplink power levels observed during the specified time interval that are above a pre-determined threshold; and instructing, based on the received reports, the plurality of OLTs to transmit a downstream power indication signal to facilitate activation of at least one ONU from the set of ONUs.

14. The computer program product of claim 13, wherein the set of the plurality of ONUs is selected based on a serial number mask mechanism.

15. The computer program product of claim 13, wherein the upstream transmission comprises an unmodulated signal transmission.

16. The computer program product of claim 13, wherein the pre-determined threshold is selected to detect presence of a single ONU.

17. The computer program product of claim 13, wherein the coordinated power grant not suppressing uplink transmissions by other ONUs not in the set of ONUs is during the specified time interval.

18. The computer program product of claim 13, wherein each of the plurality of OLTs are configured to operate on a unique downstream wavelength channel and a unique upstream wavelength channel.

* * * * *